(12) United States Patent
Kim et al.

(10) Patent No.: US 9,646,527 B2
(45) Date of Patent: May 9, 2017

(54) DISPLAY APPARATUS, METHOD OF CONTROLLING THE SAME, AND DATA TRANSMITTING METHOD OF DISPLAY APPARATUS

(71) Applicant: SAMSUNG ELECTRONICS CO., LTD., Suwon-si (KR)

(72) Inventors: Ju-yeun Kim, Suwon-si (KR); Dae-sun Oh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/728,001

(22) Filed: Jun. 2, 2015

(65) Prior Publication Data

US 2016/0093242 A1  Mar. 31, 2016

(30) Foreign Application Priority Data

Sep. 25, 2014  (KR) .......................... 10-2014-0128429

(51) Int. Cl.
| | |
|---|---|
| G09G 3/20 | (2006.01) |
| G09G 5/02 | (2006.01) |
| G09G 5/14 | (2006.01) |
| H04N 5/272 | (2006.01) |
| H04N 5/445 | (2011.01) |

(Continued)

(52) U.S. Cl.
CPC ........... *G09G 3/2003* (2013.01); *G09G 5/026* (2013.01); *G09G 5/14* (2013.01); *H04N 5/272* (2013.01); *H04N 5/44504* (2013.01); *H04N 21/42653* (2013.01); *H04N 21/485* (2013.01);

(Continued)

(58) Field of Classification Search
CPC combination set(s) only.
See application file for complete search history.

(56) References Cited

U.S. PATENT DOCUMENTS 5,914,725 A *  6/1999  MacInnis .............. G06T 3/4007
                                                              345/441
5,953,691 A     9/1999  Mills
(Continued)

FOREIGN PATENT DOCUMENTS

| KR | 10-2006-0022419 A | 3/2006 |
|---|---|---|
| KR | 10-2011-0026806 A | 3/2011 |

OTHER PUBLICATIONS

Written Opinion, issued by International Searching Authority in corresponding International Application No. PCT/KR2015/007623, mailed on Nov. 27, 2015. ( PCT/ISA/237).

(Continued)

*Primary Examiner* — Wesner Sajous
(74) *Attorney, Agent, or Firm* — Sughrue Mion, PLLC

(57) ABSTRACT

A display apparatus and a method of controlling the same are provided. The display apparatus includes an input device configured to receive a display signal including a video signal, a graphic signal, and an alpha value, a calculator configured to calculate effective bits of data of the video signal and the graphic signal, the effective bits of data being used to perform alpha-blending based on an alpha value of each pixel from the display signal, an alpha-blender configured to perform alpha-blending on the display signal by using the effective bits of data calculated by the calculator and the alpha value, and a display configured to display an image generated according to the alpha-blended display signal.

18 Claims, 11 Drawing Sheets

(51) Int. Cl.
*H04N 21/426* (2011.01)
*H04N 21/485* (2011.01)

(52) U.S. Cl.
CPC . *G09G 2340/0428* (2013.01); *G09G 2340/10* (2013.01); *G09G 2350/00* (2013.01)

(56) References Cited

U.S. PATENT DOCUMENTS

| | | | | |
|---|---|---|---|---|
| 6,022,302 | A * | 2/2000 | McBride | A63B 21/00043 482/121 |
| 8,184,127 | B2 | 5/2012 | Jeong | |
| 8,478,075 | B2 | 7/2013 | Lee | |
| 8,787,701 | B2 | 7/2014 | Lee | |
| 2005/0254363 | A1 * | 11/2005 | Hamada | G11B 27/034 369/47.1 |
| 2006/0050076 | A1 | 3/2006 | Jeong | |
| 2007/0245389 | A1 * | 10/2007 | Kuno | G06F 3/14 725/89 |
| 2008/0001967 | A1 | 1/2008 | Rengarajan et al. | |
| 2010/0066762 | A1 * | 3/2010 | Yeh | G06T 11/00 345/629 |
| 2010/0103195 | A1 | 4/2010 | Macinnis et al. | |
| 2010/0122341 | A1 * | 5/2010 | Golle | 726/21 |
| 2010/0253697 | A1 | 10/2010 | Rivera | |
| 2011/0057952 | A1 | 3/2011 | Lee | |
| 2013/0272628 | A1 | 10/2013 | Lee | |

OTHER PUBLICATIONS

International Search Report, issued by International Searching Authority in corresponding International Application No. PCT/KR2015/007623, mailed on Nov. 27, 2015. (PCT/ISA/210).
Communication dated Jan. 22, 2016, from the European Patent Office in counterpart European Application No. 15182807.6.
Communication dated May 11, 2016, issued by the European Patent Office in counterpart European Application No. 15182807.6.
Communication dated Nov. 9, 2016 issued by European Patent Office in counterpart European Application No. 15 182 807.6.

* cited by examiner

- Related Art -

DISPLAY APPARATUS, METHOD OF CONTROLLING THE SAME, AND DATA TRANSMITTING METHOD OF DISPLAY APPARATUS

CROSS-REFERENCE TO RELATED APPLICATIONS

This application claims priority from Korean Patent Application No. 10-2014-0128429, filed on Sep. 25, 2014, in the Korean Intellectual Property Office, the disclosure of which is incorporated herein by reference in its entirety.

BACKGROUND

Field

Apparatuses and methods consistent with exemplary embodiments relate to a display apparatus, a method of controlling the same, and a method of transmitting data of the display apparatus, and more particularly, to a display apparatus, a method of controlling the same, and a method of transmitting data of the display apparatus, for enhancing transmission efficiency of a display signal between components.

Description of the Related Art

A display apparatus may perform α-blending in order to overlay graphic image (e.g. a static image) on a video image. Alpha-blending (i.e., α-blending) refers to a function for mixing two images at a proper ratio to overlay one image on the other image. In particular, α-blending may be used to display an on-screen display (OSD) that is overlaid on a base image. Accordingly, the display apparatus may perform α-blending using an alpha value set according to a pixel in order to adjust the transparency of a graphic image.

In detail, as illustrated in FIG. 1, an input unit 10 that receives a display signal transmits video RGB data 11, graphic RGB data 12, and α data 13 that are input to the input unit 10, to a component 20 that performs α-blending. In addition, an image generated via the α-blending is displayed by a display unit 30.

According to a method illustrated in FIG. 1, in a full HD display apparatus with a 1920×1080 resolution, if all display signals for respective pixels are transmitted when an alpha value is 8 bits, a graphic signal per color is 8 bits, and a video signal per color is 16 bits. Thus, a display signal of 1920×1080×{8+(8×3)+(16×3)} needs to be transmitted to the component 20 to perform α-blending.

Accordingly, the input unit 10 of a display apparatus 100 needs to transmit all graphic signals for a pixel with an alpha value of 0 to the component 20 for α-blending and to transmit all video signals for a pixel with an alpha value of 1 to the component 20 for α-blending. Therefore, the transmission efficiency of a display signal between components is reduced.

SUMMARY

Exemplary embodiments address the above disadvantages and other disadvantages not described above. Also, the exemplary embodiments are not required to overcome the disadvantages described above, and an exemplary embodiment may not overcome any of the problems described above.

Exemplary embodiments provide a display apparatus and a method of controlling the same, for efficiently reducing the transmission amount of data between components of the display apparatus for α-blending.

According to an aspect of an exemplary embodiment, a display apparatus includes an input device configured to receive a display signal comprising a video signal, a graphic signal, and an alpha value, a calculator configured to calculate effective bits of data of the video signal and the graphic signal, the effective bits of data being used to perform alpha-blending based on an alpha value of each pixel from the display signal, an alpha-blender configured to perform alpha-blending on the display signal by using the effective bits of data calculated by the calculator and the alpha value, and a display configured to display an image generated according to the alpha-blended display signal.

The calculator may calculate only data corresponding to the graphic signal of the display signal as the effective bits of data when the alpha value is a maximum value, and calculate only data corresponding to the video signal of the display signal as the effective bits of data when the alpha value is 0.

The calculator may calculate the effective bits of data so as to increase an amount of bits of data of the graphic signal included in the effective bits of data as the alpha value increases.

The video signal included in the display signal may include R, G, and B color values of video data for each pixel, the graphic signal may include R, G, and B color values of graphic data for each pixel, and the alpha value may be a value indicating transmittance for blending the video signal and the graphic signal.

The calculator may calculate an amount of bits of data of the effective bits of data according to an expression:

$$(\alpha \times M) + (1-\alpha) \times N,$$

where α is the alpha value, M is bits per color of the graphic signal, and N is bits per color of the video signal.

The calculator may calculate the amount of bits of data of 3×(α×M) in M bits of the graphic data and data of 3×((1−α)×N) in N bits of the video data as effective bits of data when the video signal contained in the display signal comprises R, G, and B color values of the video data for each pixel, the graphic signal comprises R, G, and B color values of the graphic data for each pixel, and the alpha value is α.

The input device and the calculator may be present in a chip that is physically separated from the alpha-blender According to an aspect of another exemplary embodiment, a method of controlling a display apparatus includes receiving a display signal including a video signal, a graphic signal, and an alpha value, calculating effective bits of data of the video signal and the graphic signal, the effective bits of data being used to alpha-blending based on an alpha value of each pixel from the display signal, performing alpha-blending on the display signal by using the calculated effective bits of data and the alpha value, and displaying an image generated according to the alpha-blended display signal.

The calculating may include calculating only data corresponding to the graphic signal of the display signal as the effective bits of data when the alpha value is a maximum value, and calculating only data corresponding to the video signal of the display signal as the effective bits of data when the alpha value is 0.

The calculating may include calculating the effective bits of data so as to increase an amount of data of the graphic signal included in the effective bits of data as the alpha value increases.

The video signal included in the display signal may include R, G, and B color values of video data for each pixel, the graphic signal may include R, G, and B color values of graphic data for each pixel, and the alpha value may be a value indicating transmittance for blending the video signal and the graphic signal.

The calculating may include calculating an amount of bits of data of the effective bits of data according to an expression:

$$(\alpha \times M) + (1-\alpha) \times N,$$

where α is the alpha value, M is bits per color of the graphic signal, and N is bits per color of the video signal.

The calculating may include calculating the amount of bits of data of 3×(α×M) in M bits of the graphic data and data of 3×((1−α)×N) in N bits of the video data as effective bits of data when the video signal contained in the display signal comprises R, G, and B color values of the video data for each pixel, the graphic signal comprises R, G, and B color values of the graphic data for each pixel, and the alpha value is α.

The receiving and the calculating may be performed by a chip that is physically separated from the performing of the α-blending.

According to an aspect of another exemplary embodiment, a method of transmitting data of a display apparatus includes receiving a display signal including a video signal, a graphic signal, and an alpha value calculating effective bits of data of the video signal and the graphic signal used to perform alpha-blending based on an alpha value of each pixel from the display signal, and transmitting the calculated effective bits of data and the alpha value in order to perform alpha-blending.

The calculating may include calculating the effective bits of data so as to increase an amount of data of the graphic signal included in the effective bits of data as the alpha value increases.

The video signal included in the display signal comprises R, G, and B color values of video data for each pixel, the graphic signal comprises R, G, and B color values of graphic data for each pixel, and the alpha value is a value indicating transmittance for blending the video signal and the graphic signal.

In addition, the transmitting may include transmitting the calculated effective bits of data and the alpha value to a chip that is separately included in the display apparatus, in order to perform the alpha-blending.

According to an aspect of another exemplary embodiment, a display apparatus is provided. The display apparatus includes: an input device configured to receive a display signal comprising a video signal, a graphic signal, and an alpha value; an effective bits determiner configured to calculate effective bits of data of the video signal and the graphic signal, the effective bits of data being used to perform alpha-blending based on an alpha value of each pixel from the display signal; and an alpha-blender configured to perform alpha-blending on the display signal by using the effective bits of data calculated by the effective bits determiner and the alpha value and configured to output an alpha-blended display signal.

The effective bits determiner may be configured to calculate the effective bits of data such that effective bits of the graphic signal included in the effective bits of data increase as the alpha value increases.

The effective bits determiner may be configured to calculate the effective bits of data such that the effective bits of the graphic signal included in the effective bits of data decrease as the alpha value decreases.

The effective bits determiner may be configured to calculate the effective bits of data such that effective bits of the video signal included in the effective bits of data decrease as the alpha value increases.

The effective bits determiner may be configured to calculate the effective bits of data such that the effective bits of the video signal included in the effective bits of data increase as the alpha value decreases.

According to the various exemplary embodiments, a user may use a display apparatus with the efficiently reduced transmission amount of data between components of the display apparatus for α-blending.

Additional and/or other aspects and advantages of the exemplary embodiments will be set forth in part in the description which follows and, in part, will be obvious from the description, or may be learned by practice of the exemplary embodiments.

BRIEF DESCRIPTION OF THE DRAWING FIGURES

The above and/or other aspects will be more apparent by describing certain exemplary embodiments with reference to the accompanying drawings, in which.

DETAILED DESCRIPTION OF THE EXEMPLARY EMBODIMENTS

Hereinafter, the exemplary embodiments will be described in detail with reference to the attached drawings. In the description of the exemplary embodiments, certain detailed explanations of related art are omitted when it is deemed that they may unnecessarily obscure the essence of the exemplary embodiments. The terms used in the specification are defined in consideration of functions used in the exemplary embodiments, and can be changed according to the intent or conventionally used methods of clients, operators, and users. Accordingly, definitions of the terms should be understood on the basis of the entire description of the present specification.

Figure 1:
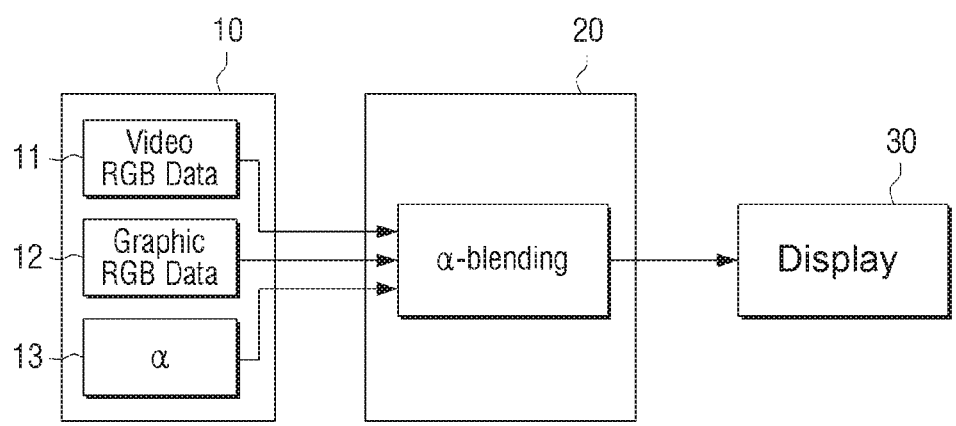
FIG. 1 is a diagram illustrating flow of a display signal.
Figure 2:
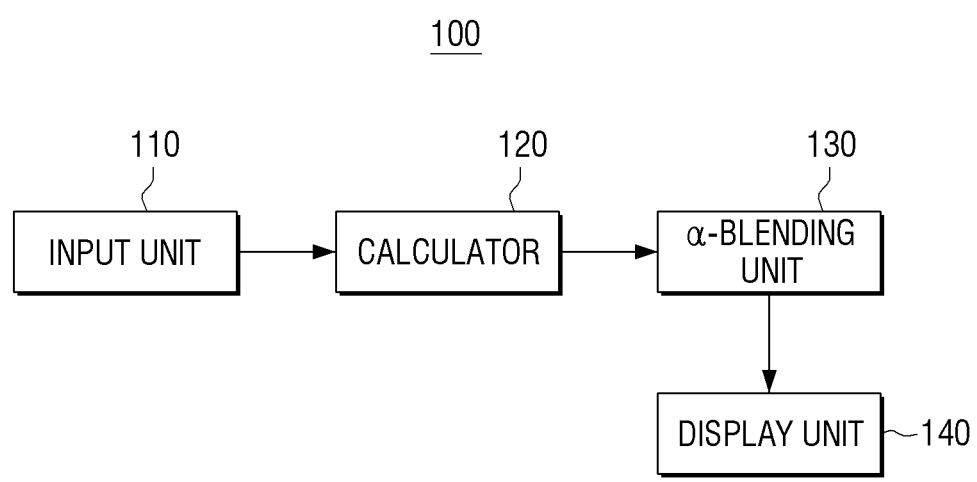
FIG. 2 is a block diagram illustrating a configuration of a display apparatus according to an exemplary embodiment.

FIG. 2 is a block diagram illustrating a configuration of a display apparatus 100 according to an exemplary embodiment. As illustrated in FIG. 2, the display apparatus 100 may include an input unit 110 (e.g., an input device, etc.), a calculator 120 (e.g., an effective data determiner, a determiner, an effective bits determiner, etc.), an α-blending unit 130 (e.g., an alpha-blender, etc.), and a display unit 140

(e.g., a display, etc.). In this case, the display apparatus 100 may be a television (TV) but is merely exemplary. Thus the display apparatus 100 may be embodied as various electronic apparatuses including the display unit 140, such as a cellular phone, a tablet personal computer (PC), a digital camera, a camcorder, a notebook PC, a personal digital assistant (PDA), a MP3 player, a portable multimedia player (PMP), a smart phone, a digital frame, a digital signage, and kiosk.

The input unit 110 is a component for receiving a display signal including a video signal, a graphic signal, and an alpha value.

That is, the input unit 110 may receive a display signal received from a device external to display apparatus or may receive a signal transmitted from outside the display apparatus 100. For example, the input unit 110 may receive a display signal of an image contained in various broadcast signals that are transmitted from a broadcaster through a radio frequency (RF) communication network. In addition, the input unit 110 may also receive a display signal contained in content that is received from a server through an IP network. The display apparatus may also receive a display signal through an external device that is physically connected to the display apparatus.

In addition, according to a user command for reproduction of image content stored in a storage medium inside or outside the display apparatus 100, the input unit 110 may receive a display signal for displaying an image from the storage medium inside or outside the display apparatus 100.

The input unit 110 may receive a video signal including R, G, and B color values of video data per pixel and receive a graphic signal including R, G, and B color values of graphic data per pixel. An alpha value may be a data value corresponding to transmittance for blending the video signal and the graphic signal.

The calculator 120 may calculate effective data, effective amount of data or effective bits of data of the video signal and the graphic signal for performing α-blending using an alpha value of each pixel from the display signal input through the input unit 110.

When an alpha value of a pixel is a maximum value, the calculator 120 may calculate only data corresponding to a graphic signal of the display signal as effective data, and when an alpha value of a pixel is 0, the calculator 120 may calculate only data corresponding to a video signal of the display signal as effective data.

That is, as an alpha value of a pixel is increased, the calculator 120 may calculate effective data so as to increase the amount of data of a graphic signal contained in the effective data.

In detail, when an alpha value is α, the graphic signal is M bit per color, and the video signal is N bit per color, the calculator 120 may quantitatively calculate the amount of effective data according to Expression 1 below.

$$(\alpha \times M) + (1-\alpha) \times N \qquad \text{Expression 1}$$

In addition, when the video signal contained in the display signal includes R, G, and B color values of the video data for each pixel, the graphic signal includes R, G, and B color values of the graphic data for each pixel, and an alpha value is α, the calculator 120 may quantitatively calculate data of $3\times(\alpha \times M)$ in the M bit of the graphic data and data of $3\times((1-\alpha)\times N)$ in the N bit of the video data as effective data.

The α-blending unit 130 is a component that performs α-blending on the display signal using the alpha value and the effective data calculated through the calculator 120. In particular, α-blending refers to a function for mixing two images at a proper ratio to overlay one image on the other image. In addition, α-blending may be used to display on-screen display (OSD) to be overlaid on a base image.

The α-blending unit 130 may overlay graphic content based on a graphic signal on video content based on a video signal according to the alpha value to generate an image.

In order to perform α-blending, video and graphic signals for displaying an image and an alpha value α indicating transparency of each pixel are required. The alpha value may be 8 bits and have a value from 0 to 255. That is, 0 indicates a state in which a graphic image is transparent and 255 indicates a state in which a graphic image is opaque.

A chip including the input unit 110 and the calculator 120 may be present in a chip that is physically separated from the α-blending unit 130. Accordingly, when the aforementioned method is used, data transmission efficiency between chips of the display apparatus 100 may be increased.

The display unit 140 is a component for displaying an image. That is, the display unit 140 may display an image signal processed through a signal processor (not shown).

The signal processor (not shown) is a component for signal-processing image information and voice information that constitute content. In response to a stream signal being received, the signal processor (not shown) may demultiplex the stream signal to separate an image signal, a sound signal, and a data signal. The signal processor (not shown) may perform decoding using a decoder when the demultiplexed image signal is an encoded image signal. For example, an MPEG-2 standard-encoded image signal may be decoded by an MPEG-2 decoder and an H.264 standard image signal of digital multimedia broadcasting (DMB) or DVB-H may be decoded by an H.264 decoder. In addition, the signal processor (not shown) may process the brightness, tint, tone, and so on of an image signal.

The signal processor (not shown) may process the demultiplexed voice signal. For example, an MPEG-2 standard-encoded voice signal may be decoded by an MPEG-2 decoder and an MPEG 4 bit sliced arithmetic coding (BSAC) standard-encoded voice signal of terrestrial digital multimedia broadcasting (DMB) may be decoded by an MPEG-4 decoder. An MPEG-2 advanced audio codec (AAC) standard-encoded voice signal of a DMB or DVB-H method may be decoded by an AAC decoder. In addition, base, treble, sound, and so on may be adjusted.

The signal processor (not shown) may data-process the demultiplexed data signal. Encoded data may be decoded and may include electronic program guide (EPG) indicating information about a program broadcast in each channel. In the case of ATSC method, the EPG may include ATSC-program and system information protocol (ATSC-PSIP) information, and in the case of DVB method, the EPG may include DVB-service information (DVB-SI).

The display unit 140 includes scaler (not shown), a frame rate converter (not shown), and a video enhancer (not shown). The scaler adjusts a picture ratio of an image. The video enhancer removes degradation or noise of an image and stores the processed image data in a frame buffer. The frame rate converter adjusts a frame rate and transmits the image data of the frame buffer to a display module according to the set frame rate.

The display module may be a circuit component for outputting an image to a display panel (not shown) and may include a timing controller (not shown), a gate driver (not shown), a data driver (not shown), and a voltage driver (not shown).

The timing controller (not shown) generates a gate control signal (a scan control signal) and a data control signal (a data signal), re-arranges received R, G, and B data, and supplies the data to the data driver (not shown). The gate driver (not shown) applies a gate on/off voltage Vgh/Vgl provided from a voltage driver according to the gate control signal generated by the timing controller, to a display panel. The data driver (not shown) completes scaling according to the data control signal generated by the timing controller (not shown) and inputs RGB data of an image frame to the display panel. The voltage driver (not shown) may generate and transmit drive voltages to a gate driver, a data driver, the display panel, and so on, respectively.

In particular, the display unit 140 may display an image using α-blended RGB data. In detail, the display unit 140 may display an image embodied with only a video signal with regard to a pixel with an alpha value of 0. In addition, the display unit 140 may display an image embodied with only a graphic signal with regard to a pixel with an alpha value of 1. That is, the display unit 140 may display an image having a high opacity of the graphic image that is overlaid onto a video image with regard to a pixel with a high alpha value.

The aforementioned display panel may be designed according to various technologies. That is, the display panel may be configured with one of an organic light emitting diode (OLED), a liquid crystal display (LCD) panel, a plasma display panel (PDP), a vacuum fluorescent display (VFD), field emission display (FED), and electro luminescence display (ELD). In addition, the display panel may be configured as an emissive-type display panel or a reflective display (E-ink, P-ink, and photonic crystal). Alternatively, the display panel may be embodied as a flexible display, a transparent display, or the like.

Figure 3:
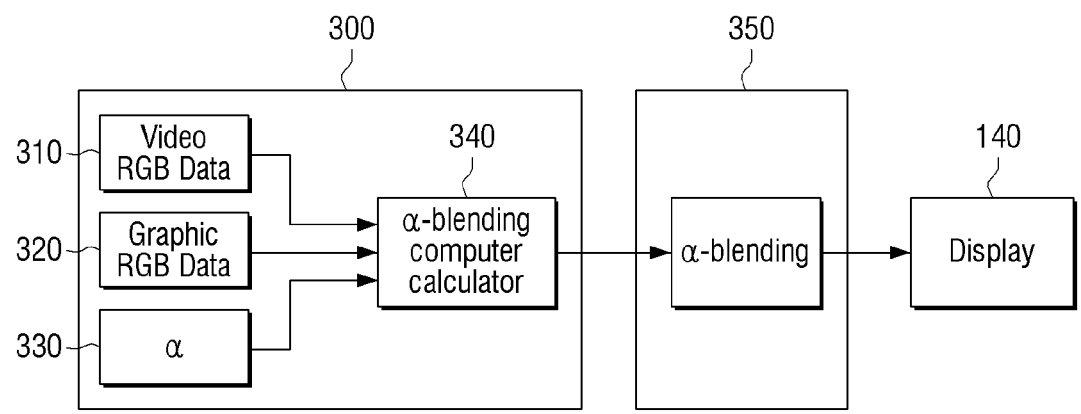
FIG. 3 is a diagram for explanation of transport stream of a display signal and calculation and processing procedures according to an exemplary embodiment.

FIG. 3 is a diagram for explanation of transport stream of a display signal and calculation and processing procedures according to an exemplary embodiment. As described above, in order to display an image received from an external broadcaster, a server, or the like or an image stored in a storage medium inside or outside the display apparatus 100, a display signal of the image to be displayed needs to be processed according to a series of procedures.

In particular, in order to display an image in which graphic data is overlaid onto video data or video data is overlaid onto graphic data, α-blending for mixing a video signal and a graphic signal at a proper ratio to generate an overlapping image or overlaid image is required.

Accordingly, as shown in FIG. 3, in order to display an image through the display unit 140, an α-blending unit 350 performs α-blending to generate an image.

In addition, an input unit 300 that receives a display signal from outside or inside of the display apparatus 100 via various methods may calculate the amount of data transmitted to the α-blending unit 350 in order to minimize a signal transmission bandwidth (B/W) to be generated by transmitting all of display signals input to the α-blending unit 350 and to reduce calculation logic and memory use amount.

In detail, when video RGB data 310 corresponding to color values of video R, G, and B is M bit per color, graphic RGB data 320 corresponding to color values of graphic R, G, and B is N bit per color, and a 330 is L bit, the input unit 300 may further include a calculator 340 for calculation of the amount of data required for α-blending so as not to quantitatively transmit data corresponding to 3×(M+N)+L per pixel to the α-blending unit 350.

For example, when the video RGB data 310 corresponding to color values of video R, G, and B is 16 bits per color, the graphic RGB data 320 corresponding to color values of graphic R, G, and B is 8 bits per color, the α 330 is 8 bits, the input unit 300 needs to transmit 80 bits per pixel to the α-blending unit 350, and thus transmission efficiency of a display signal is inevitably reduced. In addition, as the number of pixels included in the display unit 140 increases due to recent enhancement of image quality of the display unit 140, the transmission amount of data to be transmitted to the α-blending unit 350 by the input unit 300 increases.

In order to enhance the transmission efficiency of a display signal, the calculator 340 may calculate video and graphic RGB data required for α-blending using the α-blending unit 330 that is preset per pixel.

Hereinafter, with reference to FIGS. 4 and 5, a method of calculating data required for α-blending along a pixel by the calculator 340 will be described in detail.

Figure 4:
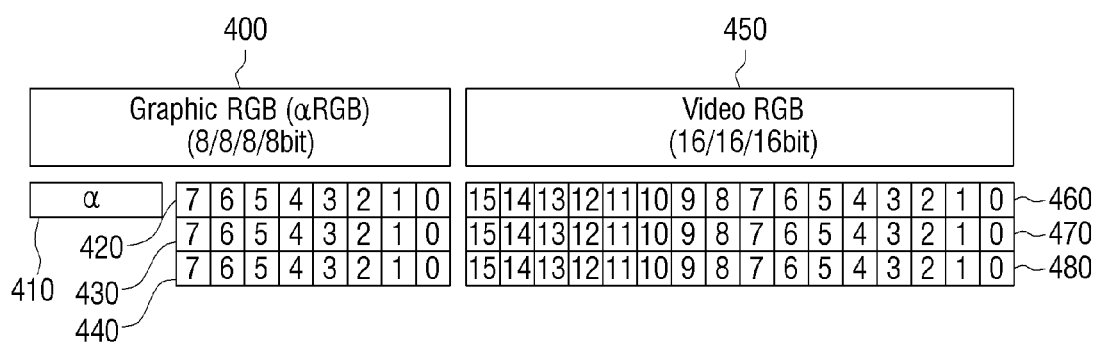
FIG. 4 is a diagram illustrating a display signal to be transmitted per pixel for α-blending according to an exemplary embodiment.

FIG. 4 is a diagram illustrating a display signal to be transmitted per pixel for α-blending according to an exemplary embodiment. In detail, a graphic signal 400 corresponding to graphic data may include 8 bits of data 420 to 440 for respective R, G, and B colors as well as 8 bits of α 410. In addition, a video signal 450 corresponding to video data may include 16 bits of data 460 to 480 for respective R, G, and B colors.

Figure 5:
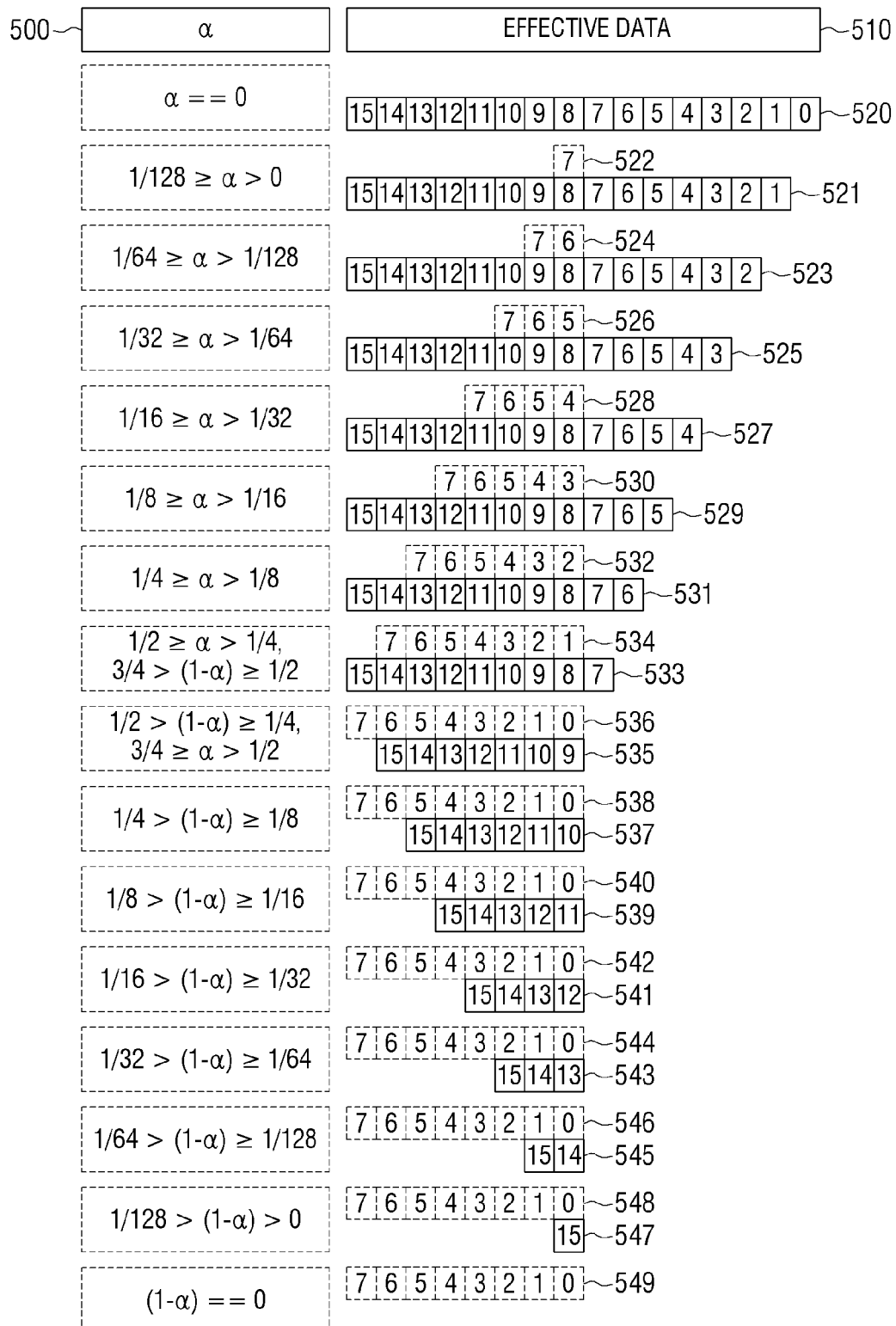
FIG. 5 is a diagram illustrating calculated effective data required for α-blending according to an exemplary embodiment.

As shown in FIG. 5, the calculator 340 may calculate effective data 510 required for performing α-blending so as to change the effective data 510 according to α 500.

In detail, when an alpha value is 0, the display unit 140 transparently displays graphic data, and thus only video data is displayed. Accordingly, the calculator 340 may calculate effective data so as to transmit only 16 bits of video signal 520. Since the video signal 520 is configured with R, G, and B colors, the input unit 300 may transmit only 48 bits of the video signal 520 to the α-blending unit 350.

As an alpha value is increased, graphic data displayed through the display unit 140 becomes opaque. Accordingly, the calculator 340 may calculate effective data so as to increase bits of a graphic signal calculated as effective data as the alpha value increases. As an alpha value increases, the amount of data of a graphic signal calculated as effective data increases and the amount of data of a video signal is reduced. For example, the effective bits of the graphic signal included in the effective bits of data increase as the alpha value increases. In addition, the effective bits of the graphic signal included in the effective bits of data decrease as the alpha value decreases. In another example, the effective bits of the video signal included in the effective bits of data decrease as the alpha value increases. In addition, the effective bits of the video signal included in the effective bits of data increase as the alpha value decreases. One or more threshold alpha values may be used to increase or decrease the effective bits of the video signal and the effective bits of the graphic signal included in the effective bits of data.

As shown in FIG. 5, when an alpha value is greater than 0 and is equal or smaller than $1/128$, that is, $2^{-7}$, the calculator 340 may calculate graphic data with 1 bit per color as effective data. Accordingly, 1 bit 522 of a lower portion of a graphic signal may be transmitted to the α-blending unit 350. Since a graphic signal includes R, G, and B colors, 3 bits of graphic signal may be transmitted to the α-blending unit 350.

A graphic signal transmitted to the α-blending unit 350 is increased by 1 bit, but a transmitted video signal may be reduced by 1 bit. Accordingly, 1 bit of graphic signal and 15 bits of video signal may be transmitted per color to the α-blending unit 350.

In addition, when an alpha value is greater than $1/128$ and is equal or smaller than $1/64$, that is, $2^{-6}$, the calculator 340 may calculate graphic data with 2 bits per color as effective data. Accordingly, 2 bits of a lower portion of a graphic signal may be transmitted to the α-blending unit 350. Since a graphic signal includes R, G, and B colors, 6 bits of graphic signal may be transmitted to the α-blending unit 350.

In addition, when an alpha value is greater than 1/64 and is equal or smaller than 1/32, that is, $2^{-5}$, the calculator 340 may calculate graphic data with 3 bits per color as effective data. Accordingly, 3 bits of a lower portion of a graphic signal may be transmitted to the α-blending unit 350. Since a graphic signal includes R, G, and B colors, 9 bits of graphic signal may be transmitted to the α-blending unit 350.

When an alpha value is greater than 1/32 and is equal or smaller than 1/16, that is, $2^{-4}$, the calculator 340 may calculate graphic data with 4 bits per color as effective data. Accordingly, 4 bits of a lower portion of a graphic signal may be transmitted to the α-blending unit 350. Since a graphic signal includes R, G, and B colors, 12 bits of graphic signal may be transmitted to the α-blending unit 350.

When an alpha value is greater than 1/16 and is equal or smaller than 1/8, that is, $2^{-3}$, the calculator 340 may calculate graphic data with 5 bits per color as effective data. Accordingly, 5 bits of a lower portion of a graphic signal may be transmitted to the α-blending unit 350. Since a graphic signal includes R, G, and B colors, 15 bits of graphic signal may be transmitted to the α-blending unit 350.

When an alpha value is greater than 1/8 and is equal or smaller than 1/4, that is, $2^{-2}$, the calculator 340 may calculate graphic data with 6 bits per color as effective data. Accordingly, 6 bits of a lower end of a graphic signal may be transmitted to the α-blending unit 350. Since a graphic signal includes R, G, and B colors, 18 bits of graphic signal may be transmitted to the α-blending unit 350.

When an alpha value is greater than 1/4 and is equal or smaller than 1/2, that is, $2^{-1}$, the calculator 340 may calculate graphic data with 7 bits per color and video data with 9 bits as effective data. Since a graphic signal includes R, G, and B colors, 21 bits of graphic signal may be transmitted to the α-blending unit 350.

When an alpha value is greater than 1/2, the calculator 340 may calculate graphic data with 8 bit per color as effective data. Accordingly, when the alpha value is greater than 1/2, entire graphic data is contained in the calculated effective data and only the amount of data corresponding to a video signal may be gradually reduced.

When an alpha value is 1, the display unit 140 opaquely displays graphic data, and thus only the graphic data may be displayed. Accordingly, the calculator 340 may calculate effective data so as to only 8 bits of graphic signal 549. Since the graphic signal 549 includes R, G, and B colors, the input unit 300 may transmit only 24 bits of graphic signal 549 to the α-blending unit 350.

In response to all display signals per pixel being transmitted to the α-blending unit 350, 1920×1080×{8+(8×3)+(16×3)} bits need to be used to transmit a display signal of the size 1920×1080, which is a full HD signal. However, according to the aforementioned display signal transmitting method, the transmission amount of required video and graphic signals may be remarkably reduced according to a pixel. Accordingly, a signal transmission B/W for video and graphic processing of the display apparatus 100 may be minimized and calculation logic and memory use amount may be minimized so as to effectively transmit a display signal for α-blending.

Although the example shown in FIG. 5 describes certain threshold alpha values for increasing or decreasing the use of bits of the video signal and for increasing or decreasing the use of bits of the graphic signal. The threshold values may be set according to a predetermined formula or by a user setting. Further, the number of threshold alpha values may be increased or decreased as necessary.

Figure 6A:
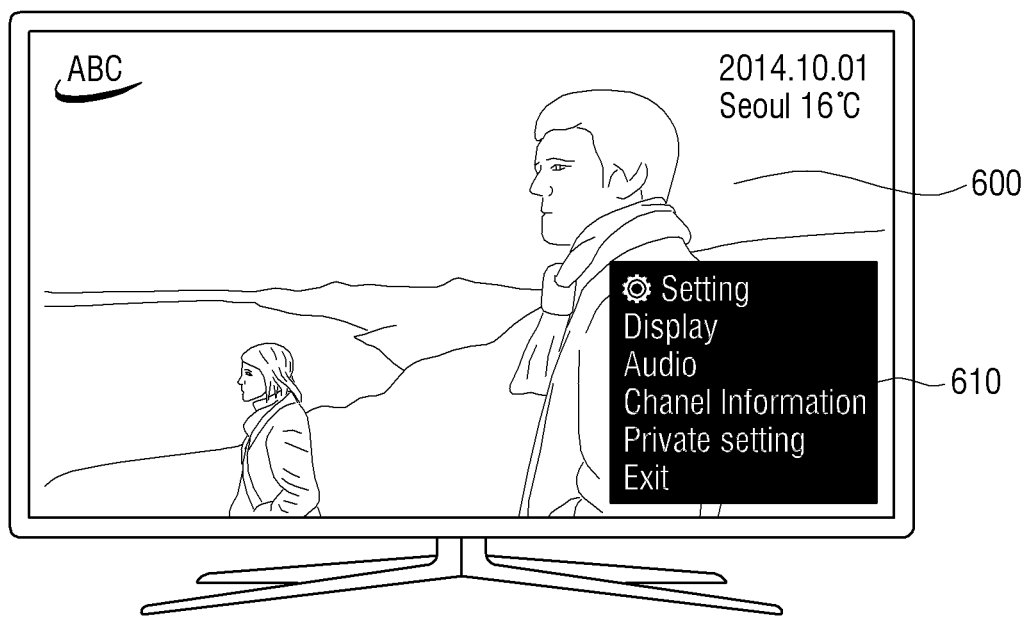
FIGS. 6A to 6D are diagrams illustrating a display image according to an exemplary embodiment.

FIGS. 6A to 6D are diagrams illustrating the display apparatus 100 for displaying an α-blended image according to the aforementioned method. In FIG. 6A, an OSD menu 610 as a graphic image may be opaquely displayed to be overlaid on one region of a video image 600. That is, the calculator 340 calculates data so as to transmit a video signal and an alpha value (i.e., 0) corresponding to the video image 600, to the α-blending unit 350 with respect to pixels of the remaining region except for a region of the OSD menu 610 and calculates data so as to transmit a graphic signal and an alpha value (i.e., a maximum alpha value) corresponding to an image of the OSD menu 610, to the α-blending unit 350 with respect to pixels of the region of the OSD menu 610, and according to the calculation result, the display unit 140 may display an image shown in FIG. 6A.

Figure 6B:
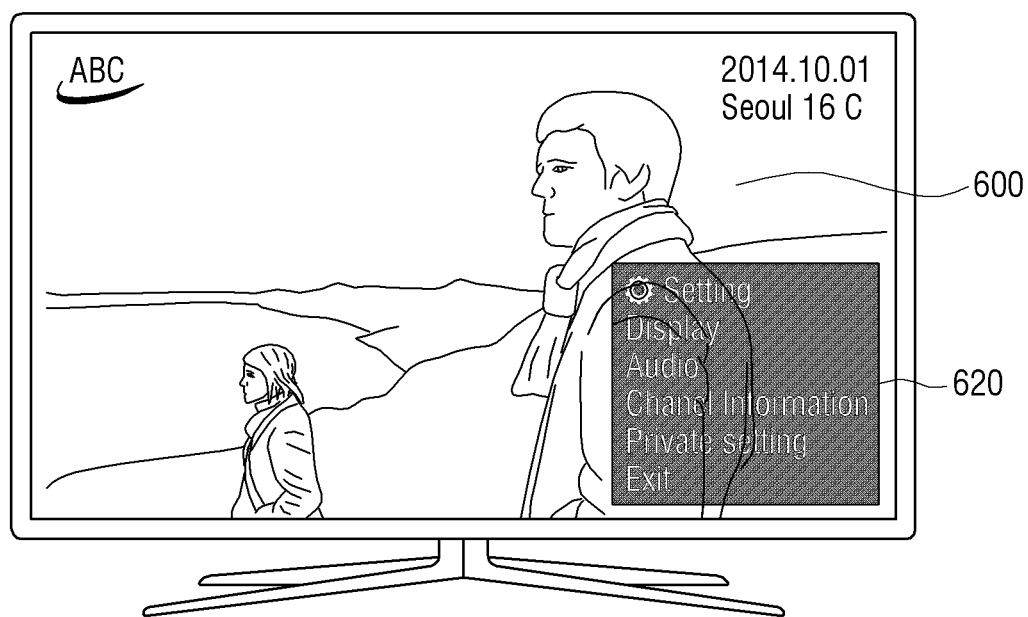

In FIG. 6B, an OSD menu 620 as a graphic image is more transparently displayed to be overlaid on one region of the video image 600 than in FIG. 6A. That is, the calculator 340 calculates data so as to transmit a video signal and an alpha value (i.e., 0) corresponding to the video image 600, to the α-blending unit 350 with respect to pixels of the remaining region except for a region of the OSD menu 620 and calculates data so as to transmit a video signal corresponding to the video image 600 and a graphic signal and an alpha value (i.e., a value smaller than a maximum alpha value) corresponding to an image of the OSD menu 620, to the α-blending unit 350 with respect to pixels of the region of the OSD menu 620, and according to the calculation result, the display unit 140 may display an image shown in FIG. 6B.

Figure 6C:
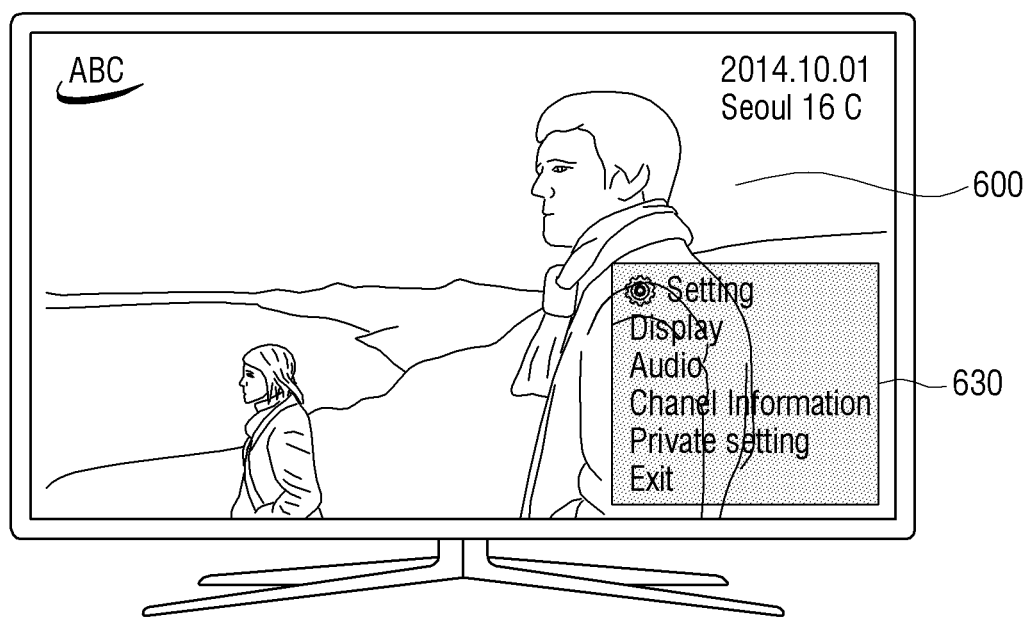

In FIG. 6C, an OSD menu 630 as a graphic image is more transparently displayed to be overlaid on one region of the video image 600 than in FIG. 6B. That is, the calculator 340 calculates data so as to transmit a video signal and an alpha value (i.e., 0) corresponding to the video image 600, to the α-blending unit 350 with respect to pixels of the remaining region except for a region of the OSD menu 630 and calculates data so as to transmit a video signal corresponding to the video image 600 and a graphic signal and an alpha value (i.e., a value smaller than the alpha value described with reference to FIG. 6B) corresponding to an image of the OSD menu 630, to the α-blending unit 350 with respect to pixels of the region of the OSD menu 630, and according to the calculation result, the display unit 140 may display an image shown in FIG. 6C.

Figure 6D:
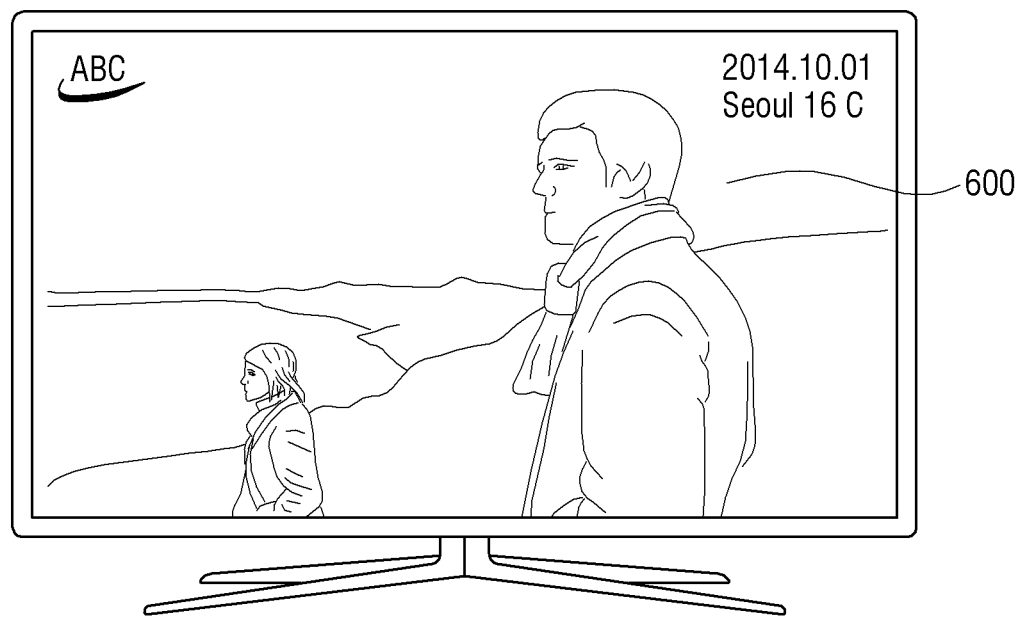

FIG. 6D is a diagram illustrating the case in which the display unit 140 displays only the video image 600. The exemplary embodiment shown in FIG. 6D corresponds to the case in which an alpha value is 0 in all pixels of the display unit 140. That is, FIG. 6D corresponds to the result obtained by calculating only a video signal corresponding to the video image 600 as effective data using an alpha value 0 with respect to all pixels by the calculator 340.

Figure 7:
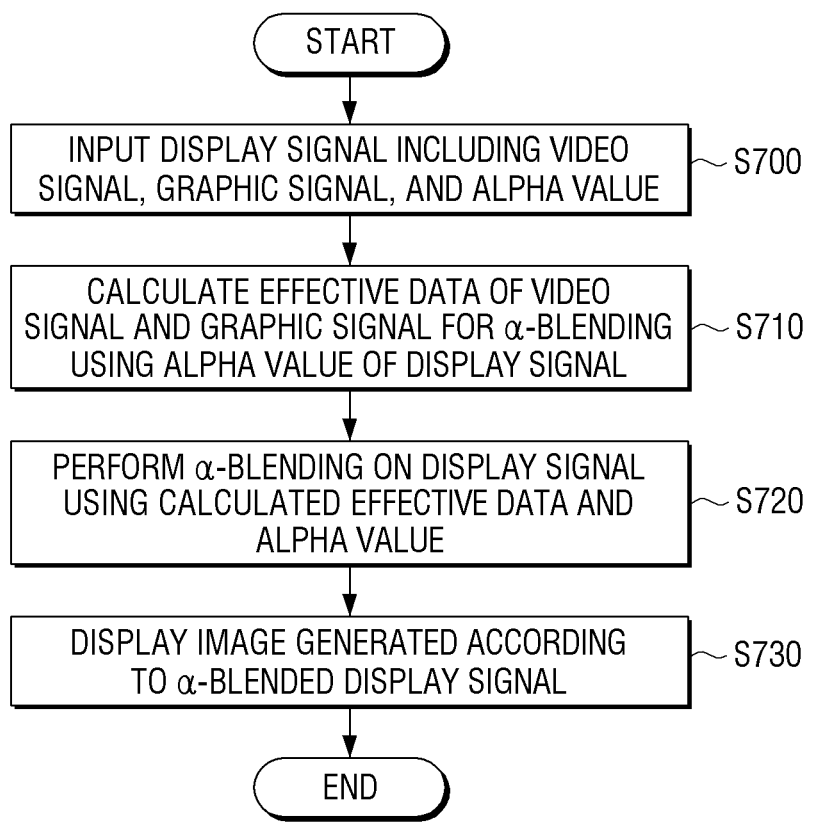
FIG. 7 is a flowchart illustrating a method of controlling a display apparatus according to an exemplary embodiment.

FIG. 7 is a flowchart illustrating a method of controlling the display apparatus 100 according to an exemplary embodiment. The display apparatus 100 receives a display signal including a video signal, a graphic signal, and an alpha value (operation S700). That is, the display apparatus 100 may receive a display signal of an image included in various broadcast signals transmitted from a broadcaster through a radio frequency (RF) communication network or receive a display signal included in content received from a server through an Internet protocol (IP) network. In addition, the display apparatus 100 may use an image signal stored in a storage medium inside or outside the display apparatus 100.

A video signal included in the display signal may include R, G, and B color values of video data per pixel and a graphic signal may include R, G, and B color values of graphic data per pixel. In addition, an alpha value may be a data value corresponding to transmittance for blending the video signal and the graphic signal.

The display apparatus 100 may calculate effective data of the video signal and the graphic signal for performing α-blending using the alpha value of the received display signal (operation S710) and perform α-blending on the display signal using the calculated effective data and alpha value (operation S720).

α-blending refers to refers to a function for mixing two images at a proper ratio to overlay one image on the other image. In particular, α-blending may be used to display on-screen display (OSD) overlaid on a base image.

That is, the display apparatus 100 may generate an image so as to overlay graphic content based on a graphic signal on video content based on a video signal according to an alpha value. In order to perform α-blending, video and graphic signals for displaying an image and an alpha value α indicating transparency of each pixel are required. The alpha value may be 8 bits and have a value from 0 to 255. That is, 0 indicates a state in which a graphic image is transparent and 255 indicates a state in which a graphic image is opaque.

The display apparatus 100 may calculate effective data required to perform α-blending in each pixel using an alpha value set for each pixel. That is, a chip that receives a display signal of the display apparatus 100 may first calculate effective data using an alpha value for each pixel and then transmit only a display signal corresponding to the effective data to a chip for α-blending.

In detail, when an alpha value is 0, graphic data is transparently displayed. Thus, the display apparatus 100 may calculate only a video signal as effective data with respect to a pixel with an alpha value of 0. In addition, when an alpha value is 1, graphic data is opaquely displayed. Thus, the display apparatus 100 may calculate only a graphic signal as effective data with respect to a pixel with an alpha value of 1.

That is, a chip for α-blending may receive only data required for α-blending for each pixel and perform α-blending.

In addition, the display apparatus 100 displays an image generated according to an α-blended display signal (operation S730). The display apparatus 100 may display an image in which video data and graphic data overlap with each other or where one image is overlaid onto the other according to a pixel. That is, as an alpha value of a pixel is increased, the display apparatus 100 may generate and display an image with a greater opaque degree of a graphic signal of video data.

Figure 8:
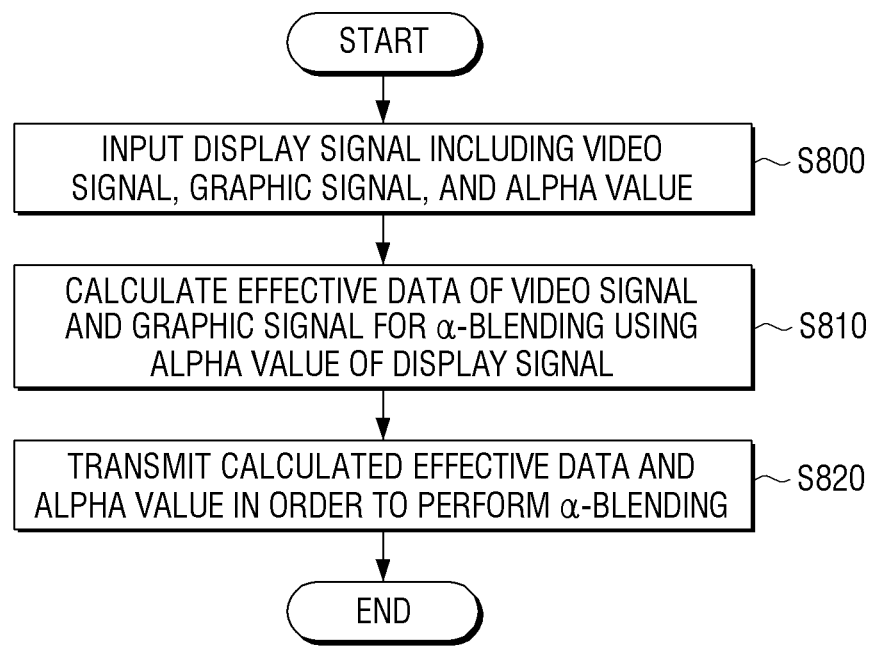
FIG. 8 is a flowchart illustrating a method of transmitting data of a display apparatus according to an exemplary embodiment.

FIG. 8 is a flowchart illustrating a method of transmitting data of a display apparatus according to an exemplary embodiment. A component for receiving a display signal in the display apparatus 100 and a component for performing α-blending may be present in different chips. That is, the display apparatus 100 receives a display signal including a video signal, a graphic signal, and an alpha value (operation S800) and calculates effective data of video and graphic signals for performing α-blending using an alpha value of the display signal (operation S810).

In addition, the display apparatus 100 transmits the effective data and the alpha value in order to perform α-blending (operation S820). That is, the display apparatus 100 may transmit the calculated effective chip and alpha value to a chip for performing α-blending, which is a separate chip from a chip that calculates effective data.

The aforementioned method of controlling a display apparatus according to various exemplary embodiments may be coded in software and stored in a non-transitory readable medium. The non-transitory readable medium may be installed and used in various apparatuses.

The non-transitory computer readable media refers to a medium that semipermanently stores data and is readable by a device instead of a medium that stores data for a short time period, such as a register, a cache, a memory, etc. In detail, the aforementioned programs may be stored and provided in the non-transitory computer readable media such as CD, DVD, hard disc, blue ray disc, USB, a memory card, ROM, etc.

The foregoing exemplary embodiments and advantages are merely exemplary and are not to be construed as limiting the inventive concept. Also, the description of the exemplary embodiments is intended to be illustrative, and not to limit the scope of the claims, and many alternatives, modifications, and variations will be apparent to those skilled in the art.

What is claimed is:

1. A display apparatus comprising:
an input device configured to receive a display signal comprising a video signal, a graphic signal, and an alpha value;
a calculator configured to calculate effective bits of the video signal and effective bits of the graphic signal based on the alpha value;
an alpha-blender configured to perform the alpha-blending on the display signal based on the calculated effective bits of the video signal and the graphic signal and the alpha value; and
a display configured to display an image generated according to the alpha-blended display signal,
wherein the effective bits are a number of bits of the video signal and a number of bits of the graphic signal, the effective bits being selected from a total number of bits of the video signal and the graphic signal to be less than the total number of bits and to be provided from the calculator to the alpha-blender for the alpha-blending.

2. A display apparatus comprising:
an input device configured to receive a display signal comprising a video signal, a graphic signal, and an alpha value;
a calculator configured to calculate effective bits of data of the video signal and the graphic signal, the effective bits of data being used to perform alpha-blending based on an alpha value of each pixel from the display signal; and
an alpha-blender configured to perform alpha-blending on the display signal by using the effective bits of data calculated by the calculator and the alpha value,
wherein the effective bits are a number of bits of the video signal and a number of bits of the graphic signal, the effective bits being selected from a total number of bits of the video signal and the graphic signal to be less than the total number of bits and to be provided from the calculator to the alpha-blender for the alpha-blending, and
wherein the calculator calculates the effective bits of data so as to increase an amount of bits of data of the graphic signal included in the effective bits of data as the alpha value increases.

3. The display apparatus as claimed in claim 2, wherein the calculator calculates only data corresponding to the graphic signal of the display signal as the effective bits of data when the alpha value is a maximum value, and calculates only data corresponding to the video signal of the display signal as the effective bits of data when the alpha value is 0.

4. The display apparatus as claimed in claim 2, wherein the video signal included in the display signal comprises R, G, and B color values of video data for each pixel, the graphic signal comprises R, G, and B color values of graphic data for each pixel, and the alpha value is a value indicating transmittance for blending the video signal and the graphic signal.

5. The display apparatus as claimed in claim 2, wherein the calculator calculates an amount of bits of data of the effective bits of data according to an expression:

$$(\alpha \times M)+(1-\alpha)\times N,$$

where $\alpha$ is the alpha value, M is bits per color of the graphic signal, and N is bits per color of the video signal.

6. The display apparatus as claimed in claim 5, wherein the calculator calculates the amount of bits of data of $3\times(\alpha\times M)$ in M bits of the graphic data and data of $3\times((1-\alpha)\times N)$ in N bits of the video data as effective bits of data when the video signal contained in the display signal comprises R, G, and B color values of the video data for each pixel, the graphic signal comprises R, G, and B color values of the graphic data for each pixel, and the alpha value is $\alpha$.

7. The display apparatus as claimed in claim 2, wherein the input device and the calculator are present in a chip that is physically separated from the alpha-blender.

8. A method of controlling a display apparatus, the method comprising:
receiving a display signal comprising a video signal, a graphic signal, and an alpha value;
calculating effective bits of the video signal and effective bits of the graphic signal based on the alpha value, the effective bits of the video signal and the graphic signal being used to alpha-blending based on the alpha value; and
performing alpha-blending on the display signal based on the calculated effective bits of the video signal and the graphic signal and the alpha value; and
displaying an image generated according to the alpha-blended display signal,
wherein the effective bits are a number of bits of the video signal and a number of bits of the graphic signal, the effective bits being selected from a total number of bits of the video signal and the graphic signal to be provided for the alpha-blending after the calculating.

9. A method of controlling a display apparatus, the method comprising:
receiving a display signal comprising a video signal, a graphic signal, and an alpha value;
calculating effective bits of data of the video signal and the graphic signal, the effective bits of data being used to alpha-blending based on an alpha value of each pixel from the display signal; and
performing alpha-blending on the display signal by using the calculated effective bits of data and the alpha value,
wherein the effective bits are a number of bits of the video signal and a number of bits of the graphic signal, the effective bits being selected from a total number of bits of the video signal and the graphic signal to be provided for the alpha-blending after the calculating, and wherein the calculating comprises calculating the effective bits of data so as to increase an amount of data of the graphic signal included in the effective bits of data as the alpha value increases.

10. The method as claimed in claim 9, wherein the calculating comprises calculating only data corresponding to the graphic signal of the display signal as the effective bits of data when the alpha value is a maximum value, and calculating only data corresponding to the video signal of the display signal as the effective bits of data when the alpha value is 0.

11. The method as claimed in claim 9, wherein the video signal included in the display signal comprises R, G, and B color values of video data for each pixel, the graphic signal comprises R, G, and B color values of graphic data for each pixel, and the alpha value is a value indicating transmittance for blending the video signal and the graphic signal.

12. A method of transmitting data of a display apparatus, the method comprising:
receiving a display signal comprising a video signal, a graphic signal, and an alpha value;
calculating effective bits of data of the video signal and the graphic signal used to perform alpha-blending based on the alpha value; and
transmitting the calculated effective bits of data and the alpha value in order to perform alpha-blending,
wherein the effective bits are a number of bits of the video signal and a number of bits of the graphic signal, the effective bits being selected from a total number of bits of the video signal and the graphic signal to be provided for the alpha-blending after the calculating, and
wherein the calculating comprises calculating the effective bits of data so as to increase an amount of data of the graphic signal included in the effective bits of data as the alpha value increases.

13. The method as claimed in claim 12, wherein the video signal included in the display signal comprises R, G, and B color values of video data for each pixel, the graphic signal comprises R, G, and B color values of graphic data for each pixel, and the alpha value is a value indicating transmittance for blending the video signal and the graphic signal.

14. The method as claimed in claim 12, wherein the transmitting comprises transmitting the calculated effective bits of data and the alpha value to a chip that is separately included in the display apparatus, in order to perform the alpha-blending.

15. A display apparatus comprising:
an input device configured to receive a display signal comprising a video signal, a graphic signal, and an alpha value;
an effective bits determiner configured to calculate effective bits of data of the video signal and the graphic signal, the effective bits of data being used to perform alpha-blending based on an alpha value of each pixel from the display signal; and
an alpha-blender configured to perform alpha-blending on the display signal by using the effective bits of data calculated by the effective bits determiner and the alpha value and configured to output an alpha-blended display signal,
wherein the effective bits are a number of bits of the video signal and a number of bits of the graphic signal, the effective bits being selected from a total number of bits of the video signal and the graphic signal to be provided from the effective bits determiner to the alpha-blender, and wherein the effective bits determiner is configured to calculate the effective bits of data such that effective bits of the video signal included in the effective bits of data decrease as the alpha value increases.

16. The display apparatus as claimed in claim 15, wherein the effective bits determiner is configured to calculate the effective bits of data such that effective bits of the graphic signal included in the effective bits of data increase as the alpha value increases.

17. The display apparatus as claimed in claim 16, wherein the effective bits determiner is configured to calculate the effective bits of data such that the effective bits of the graphic signal included in the effective bits of data decrease as the alpha value decreases.

18. The display apparatus as claimed in claim 15, wherein the effective bits determiner is configured to calculate the effective bits of data such that the effective bits of the video signal included in the effective bits of data increase as the alpha value decreases.

* * * * *